United States Patent [19]

Matsumura et al.

[11] Patent Number: 4,563,576

[45] Date of Patent: Jan. 7, 1986

[54] FOCUS DETECTING SYSTEM DETECTING POSITION OF IMAGES FORMED FROM THE CENTER AND PERIPHERY OF THE OPTICAL AXIS

[75] Inventors: Susumu Matsumura; Takashi Suzuki, both of Yokohama; Kenji Suzuki, Kawasaki, all of Japan

[73] Assignee: Canon Kabushiki Kaisha, Tokyo, Japan

[21] Appl. No.: 537,676

[22] Filed: Sep. 30, 1983

[30] Foreign Application Priority Data

Oct. 7, 1982 [JP] Japan .................. 57-177043

[51] Int. Cl.⁴ .................. G03B 3/00; G01J 1/36
[52] U.S. Cl. .................. 250/204; 354/406; 250/201
[58] Field of Search .............. 354/406, 407; 250/204, 250/201; 350/169; 356/4

[56] References Cited

U.S. PATENT DOCUMENTS 3,875,401  4/1975  Stauffer .................. 250/201
4,497,561  2/1985  Suzuki .................. 354/406

Primary Examiner—David C. Nelms
Assistant Examiner—J. Jon Brophy
Attorney, Agent, or Firm—Fitzpatrick, Cella, Harper & Scinto

[57] ABSTRACT

A focusing detecting system for discriminating a focusing state of an object lens by detecting a relative positional relation of a plurality of object images formed by light fluxes from the object lens, by photo-sensing means is disclosed. A plurality of object images are formed based on a light flux from a center area of the object lens around an optical axis and a plurality of object images are formed based on a light flux an area in the periphery of the center area around the optical axis, by optical means disposed behind an image plane of the object lens. Light shielding means having a plurality of slits is disposed near the image plane. By those means, a state is which the object images based on the light fluxes from the center area of the object lens around the optical axis and the peripheral area are detectable and a state is which the object images based on only the light flux from the center area of the object lens around the optical axis is detectable are discriminated.

4 Claims, 7 Drawing Figures

FOCUS DETECTING SYSTEM DETECTING POSITION OF IMAGES FORMED FROM THE CENTER AND PERIPHERY OF THE OPTICAL AXIS

BACKGROUND OF THE INVENTION

1. Field of the Invention

The present invention relates to a focus detecting system for a camera, and more particularly to a TTL type focus system which can detect a focusing state of an imaging lens by light fluxes from the imaging lens.

2. Description of the Prior Art

A focusing detecting system which detects a focusing state of an object lens by detecting a relative positional relation of a plurality of object images formed based on light fluxes from the object lens, by photo-sensing means has been known, for example, by U.S. Pat. No. 3,875,401 issued on Apr. 1, 1975.

When such a focus detecting system is used in a single lens reflex camera which allows exchange of lenses, the following problem arises. In such a focus detecting system, it is necessary to form a plurality of object images based on a light flux which passes through a peripheral area of the object lens in order to enhance a detection precision. Thus, when the detector is used in the single lens reflex camera, if the path through which the light flux for forming the plurality of object images is set in a lighter one (having a smaller aperture F number) of the object lenses mountable to the camera body, a portion of the light flux for forming the object images is shielded when a darker lens (having a larger aperture F number) is mounted to the camera body and the focusing state cannot be exactly detected.

In order to resolve the above problem, a focus detecting system is proposed in Japanese patent application Laid-Open No. 118019/1980 (laid open on Sept. 10, 1980), in which four secondary focusing lenses are arranged behind an image plane of an object lens to form a plurality of object images by a light flux passing through a center area of the object lens around an optical axis and form a plurality of object images by a light flux passing through a peripheral area of the object lens, and outputs of four photosensing means for detecting the object images formed by the secondary focusing lenses are selected in accordance with the object lens mounted on the camera body to switch a combination of the object images for detecting a relative position in accordance with the object lens. In this detector, the relative positional relation of the object images by the light flux passed through the center area around the optical axis of the object lens and the relative positioned relation of the object images by the light flux passed through the peripheral area of the object lens can be selectively detected as required independently from the type of the object lens mounted on the camera. Accordingly, the above problem is resolved.

A focus detecting system which forms four object image without arranging four secondary focusing lenses is disclosed in Japanese patent application No. 150520/1982 filed on Aug. 30, 1982 by the applicant of the present application. Since this system does not require the four secondary focusing lens, a space is saved. FIG. 1 shows a perspective view of a focusing state detector shown in the above application. In FIG. 1, a first object image formed on an anticipated imaging plane S of an object lens 1 by light fluxes $L_1$–$L_4$ (light fluxes $L_1$ and $L_2$ pass through a peripheral area of the object lens 1, and light fluxes $L_3$ and $L_4$ pass through a center area of the object lens 1 around an optical axis L) is reformed, as second object images, onto photo-sensing planes of photo-sensing means $9a$, $9b$, $9c$ and $9d$, which are photo-electric conversion elements arranged on a secondary imaging plane 7, through a field lens 3, light dividing means 5 and a secondary focusing lens 6.

A relative positional relation of the second object images is selectively detected by the photosensing means $9a$–$9d$ to determine a focusing state of the object lens 1. A light shielding plate 2 having a slit $2a$ is arranged near the anticipated imaging plane S, and the light split means 5 and the secondary focusing lens 6 are appropriately arranged such that four second object images by the slit $2a$ do not overlap to each other on the secondary imaging plane 7.

The light dividing means 5 is a wedge-shaped prism having two light deflectros $5a$ and $5b$. The light deflector $5b$ deflect the light fluxes $L_1$ and $L_2$ impinged thereto to the opposite sides with respect to the optical axis L of the object lens 1 by an equal angle. The other light deflector $5a$ deflects the light fluxes $L_3$ and $L_4$ impinged thereto underword with respect to the optical axis X. It is arranged in front of the light deflector $5b$.

Thus, the object image formed on the anticipated imaging plane S is reformed, as four second object images, on the secondary imaging plane 7 through the light split means 5 and the secondary focusing lens 6. Numeral 4 denotes a mask plate having apertures $4a$ and $4b$ for limiting the light fluxes impinged to the light split means 5. The light fluxes are split by the apertures $4a$ and $4b$ symmetrically around the optical axis L. the field lens 3 is arranged near the anticipated imaging plane S of the object lens 1 and it focuses the light dividing means 5 at the vicinity of an exit pupil of the object lens 1. The field lens 3 has such an index of refraction that the whole light dividing means 5 is imaged within an exit pupil aperture of the object lens 1.

The second object images formed on the photosensing means $9a$ and $9c$ are formed by the light fluxes $L_1$ and $L_3$ transmitted through one side of the exit pupil of the object lens 1, and the images formed on the photosensing means $9b$ and $9d$ are formed by the light fluxes $L_2$ and $L_4$ transmitted through the other side of the exit pupil. They are formed independently from each other. Thus, when the object lens 1 is a light lens, the output signals from the photo-sensing means $9a$ and $9b$ or all of the photo-sensing means $9a$–$9d$ are used, and when the object lens 1 is a dark lens, the output signals from the photo-sensing means $9c$ and $9d$ are used to detect the relative positional relation of the object images.

In such a system disclosed, for example, in Japanese patent application Laid-Open No. 118019/1980, when the focusing state of the object lens is determined by the relative positional relation of the plurality of object images formed by the light fluxes transmitted through the peripheral area of the object lens, the object images formed by the light fluxes transmitted through the center area of the object lens are neglected. As a result, the light fluxes which enables the discrimination of the focusing state of the object lens are not fully utilized. In such a detector, the precision of detection of the focusing state is low when an object is dark.

SUMMARY OF THE INVENTION

It is an object of the present invention to provide a focus detecting system which can exactly detect a focusing state of an object lens without regard to a type of the object lens and detect the focusing state by effectively utilizing light fluxes transmitted through the object lens.

The other object of the present invention will be apparent from the following description of the preferred embodiments of the present invention.

DETAILED DESCRIPTION OF THE PREFERRED EMBODIMENTS

Figure 1:
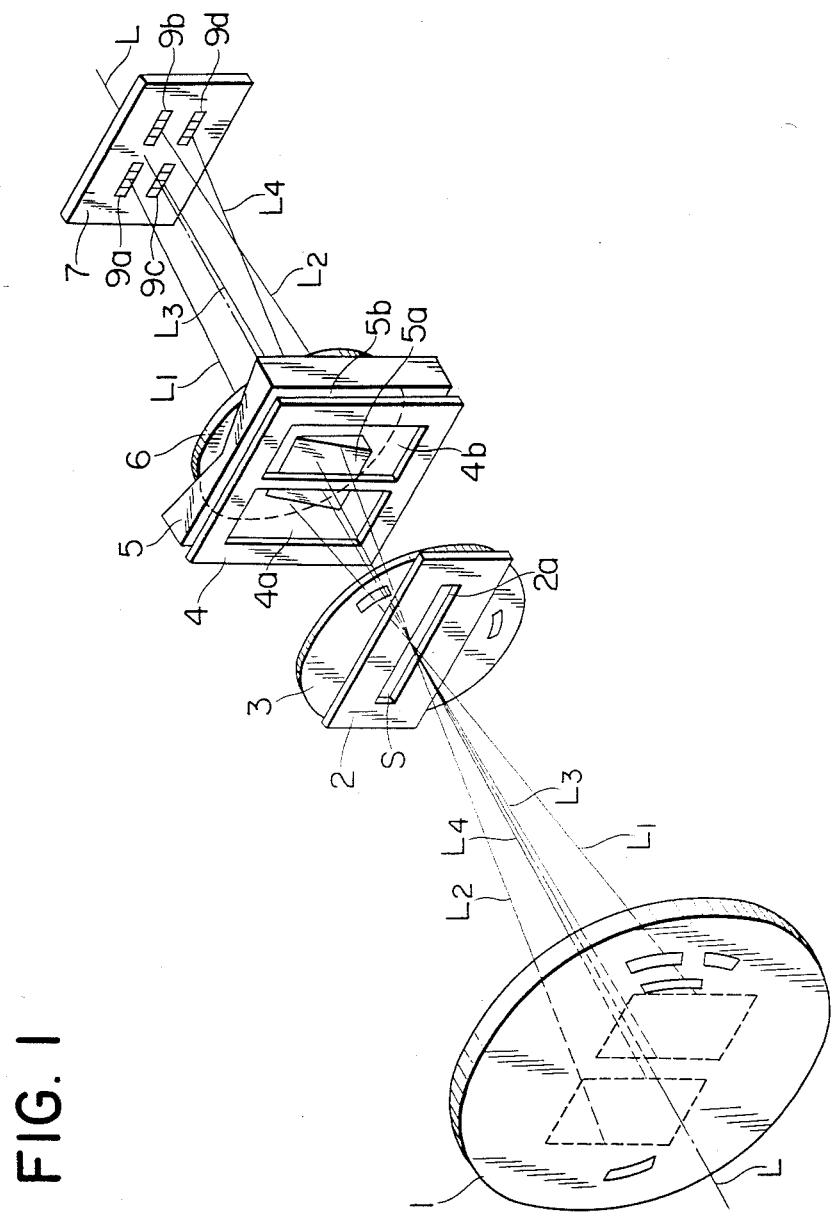
FIG. 1 is a perspective view of a focus detecting system disclosed in a patent application filed by the applicant of the present invention.
Figure 2:
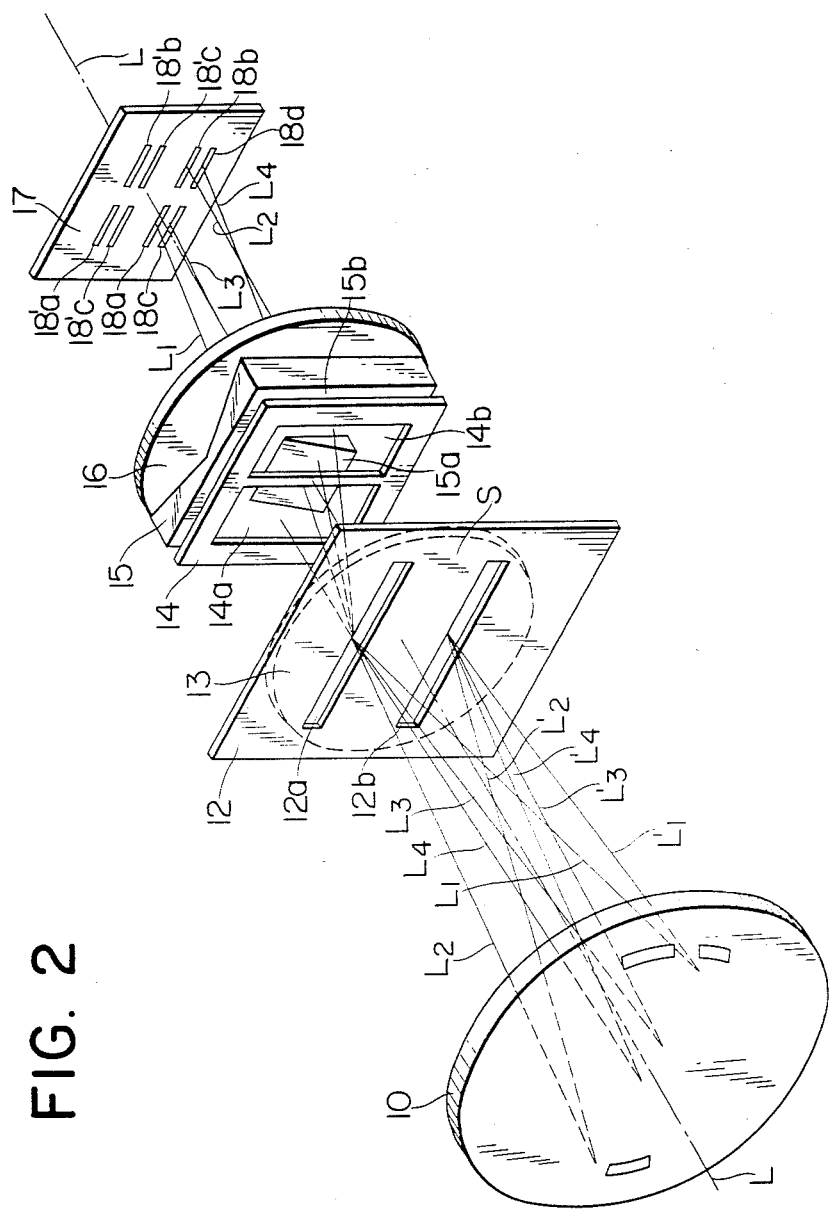
FIG. 2 is a perspective view of one embodiment of a focus detecting system of the present invention.

Referring to FIG. 2, numeral 10 denotes an object lens, numeral 12 denotes a light shielding plate arranged near an anticipated imaging plane S of the object lens 10 and having two slits 12a and 12b, and numeral 13 denotes a field lens disposed immediately behind the light shielding plate 12. Elements 14, 15 and 16 function similarly to the mask plate 4, the light split means 5 and the secondary focusing lens 6 of FIG. 1, respectively. That is, numeral 14 denotes a mask having apertures 14a and 14b to restrict light fluxes impinged to the secondary focusing lens 16, and numeral 15 denotes light split means having a light deflector 15a constructed by a wedge-shaped prism, arranged on a light deflector 15b constructed by two wedge-shaped prisms.

Two first object images formed by the light fluxes $L_1$–$L_4$ and $L'_1$–$L'_4$ transmitted through the object lens 10 and the slits 12a and 12b are refocused on a secondary imaging plane 17 as light non-overlapping second object images, through the light split means 15 and the secondary focusing lens 16. The light fluxes $L_1$–$L_4$ transmitted through the slit 12a are split by the light split means 15 and reformed by the focusing lens 16 into four non-overlapping object images 18a, 18b, 18c and 18d. Similarly, the light fluxes $L'_1$–$L'_4$ transmitted through the slit 12b are refocused into four non-overlapping object images 18'a, 18'b, 18'c and 18'd.

The field lens 13 focuses the light dividing means 15 at the vicinity of an exit pupil of the object lens 10. Thus, of the light fluxes $L_1$–$L_4$ focused at a point on the plane of the slit 12a, the light fluxes $L_1$ and $L_2$ outside of the exit pupil of the object lens 10 are directed to the light deflector 15b to form the object images 18a and 18b on the secondary imaging plane 17, and the light fluxes $L_3$ and $L_4$ inside of the exit pupil of the object lens 10 are directed to the light deflector 15a to form the object images 18c and 18d on the secondary imaging plane 17. The same is true for the light fluxes focused at a point on the plane of the slit 12b. That is, the object images 18'a and 18'b are formed by the light fluxes $L'_1$ and $L'_2$ out side of the exit pupil of the object lens 10, and the object images 18'c and 18'd are formed by the light fluxes $L'_3$ and $L'_4$ inside of the exit pupil of the object lens 10.

The slits 12a and 12b may be arranged symmetrically around the optical axis L of the object lens 10, or one slit 12a may be arranged on the optical axis L and the other slit 12b may be spaced from the optical axis L, depending on an object whose focusing state is to be detected. More than two slits may be provided and the positions of the slits may be changed as desired. A plurality of photo-sensing means (e.g. CCD) each having a plurality of photo-electric conversion elements are arranged on the secondary imaging plane 17. A relation between the photo-sensing means and the object images is shown in FIG. 3.

Figure 3:
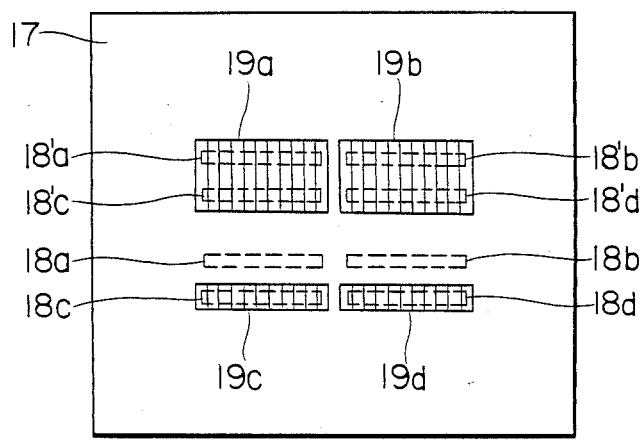
FIG. 3 is a plan view showing a relation between photo-sensing means and object images in the present embodiment.

FIG. 3 shows a relation between the photosensing means 19a, 19b, 19c and 19d arranged on the secondary imaging plane 17, and the second object images 18a–18d formed by the light fluxes $L_1$–$L_4$ transmitted through the slit 12a and the second object images 18'a–18'd formed by the light fluxes $L'_1$–$L'_4$ transmitted through the slit 12b. The photo-sensing means 19a is large enough to cover the two second object images 18'a and 18'c, and the photo-sensing means 19b is large enough to cover the two second object images 18'b and 18'd. On the other hand, the photo-sensing means 19c is sized to cover only the second object image 18c and the photo-sensing means 19d is sized to cover only the second object image 18d.

When the object lens 10 is a light one, the outputs signals from the photo-sensing means 19a and 19b are used to utilizes the light fluxes transmitted through the broad area of the exit pupil of the object lens 10 so that the precision of detection of in-focus state is increased even for a dark field. When the object lens 10 is a dark one, the output signals from the photo-sensing means 19c and 19d are used. Thus, the focusing state is detected by the object images formed by the light fluxes $L'_3$ and $L'_4$ transmitted through the center area of the exit pupil and the precision of detection of in-focus state is increased. The photo-sensing means 19a–19d may be selected by providing a pin having a length determined by the aperture F number of the object lens 10 on a lens barrel (not shown) and selectively actuating switches 30a and 30b to be described later by the pin as the object lens 10 is mounted on a camera body.

An object whose focusing state is to be detected when the photo-sensing means 19a and 19b are used is slightly different from that when the photo-sensing means 19c and 19d are used. However, the difference between the objects can be reduced by reducing the spacing between the slits 12a and 12b and hence no practical problem arises.

Figure 4:
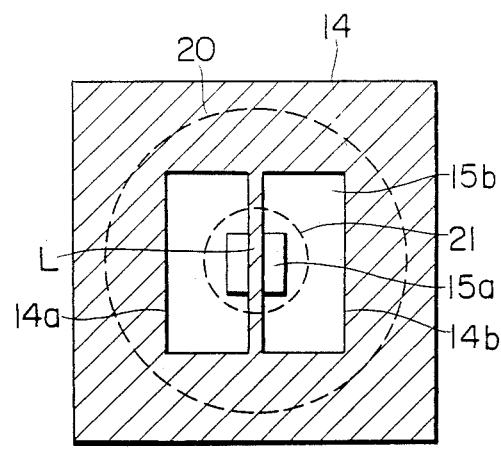
FIG. 4 is a sectional view of a main portion of the present invention.

FIG. 4 shows a relation between images of the mask plate 14 and the light dividing means 15 focused in the vicinity of the exit pupil of the object lens 10 by the field lens 13.

In FIG. 4, numerals 14'a and 14'b denote images of the apertures 14a and 14b when the mask plate 14 is focused in the vicinity of the exit pupil of the object lens 10, and numerals 20 and 21 denote the exit pupil diameter 20 is for a light object lens, and the exit pupil diameter 21 is for a dark object lens. Numerals 15a and 15b denotes images when the two light deflectors of the light split means 15 are focused is the vicinity of the exit pupil of the object lens 10. Since the light deflectors 15a and 15b are of square shape as shown in FIG. 2, the projected images of the light deflectors 15a and 15b in FIG. 4 are also square.

When the object lens 10 is light one, the image of the light deflector 15b of the light dividing means 15 delimited by the apertures 14a and 14b of the mask plate 14 impinges to the exit pupil 20, and when the object lens 10 is dark one and the exit pupil diameter 21 is small, the image of the light deflector 15a impinges to the exit pupil 21. In this manner, even when the object lens is dark one, the second object images 18c and 18d having a correct brightness distribution and no loss of light fluxes are formed on the photo-sensing planes of the photo-sensing means 18c and 18d.

It is preferable that the sizes of the images 15'a and 15'b of the light deflectors 15a and 15b are slightly larger than the sizes of the exit pupil 20 and 21, respectively, taking into consideration of a difference between the exit pupil of the different exchangeable object lens 10, an eccentricity error and displacement of the pupil due to the extension of the object lens for focusing.

A signal processing circuit of the present invention is now explained. In the signal processing method of the present embodiment, it is preferable to detect an in-focus state of the object lens 10 and also detect a direction in which the object lens 10 is to be moved when the object lens 10 is out of focus. Such a method is proposed in Japanese Patent application No. 23615/1982. In the proposed method, the output signals $a_1, a_2, \ldots a_N$ and $b_1, b_2, \ldots b_N$ from the photo-sensing means 19a and 19b are processed in accordance with a formula $$V = \sum_{i=1}^{N-k} \min\{a(i), b(i+k)\} - \sum_{i=1}^{N-k} \min\{a(i+k), b(i)\} \quad (1)$$

to produce an in-focus state discrimination signal V. In the formula (1), N is the number of photo-electric conversion elements of the photo-sensing means 19a and 19b, k is a constant, and a(i) and b(i) are outputs (positive values) of i−th (i=1−N) photo-electric conversion elements, and min {x,y} represents a smaller one of two positive real numbers.

Figure 5:
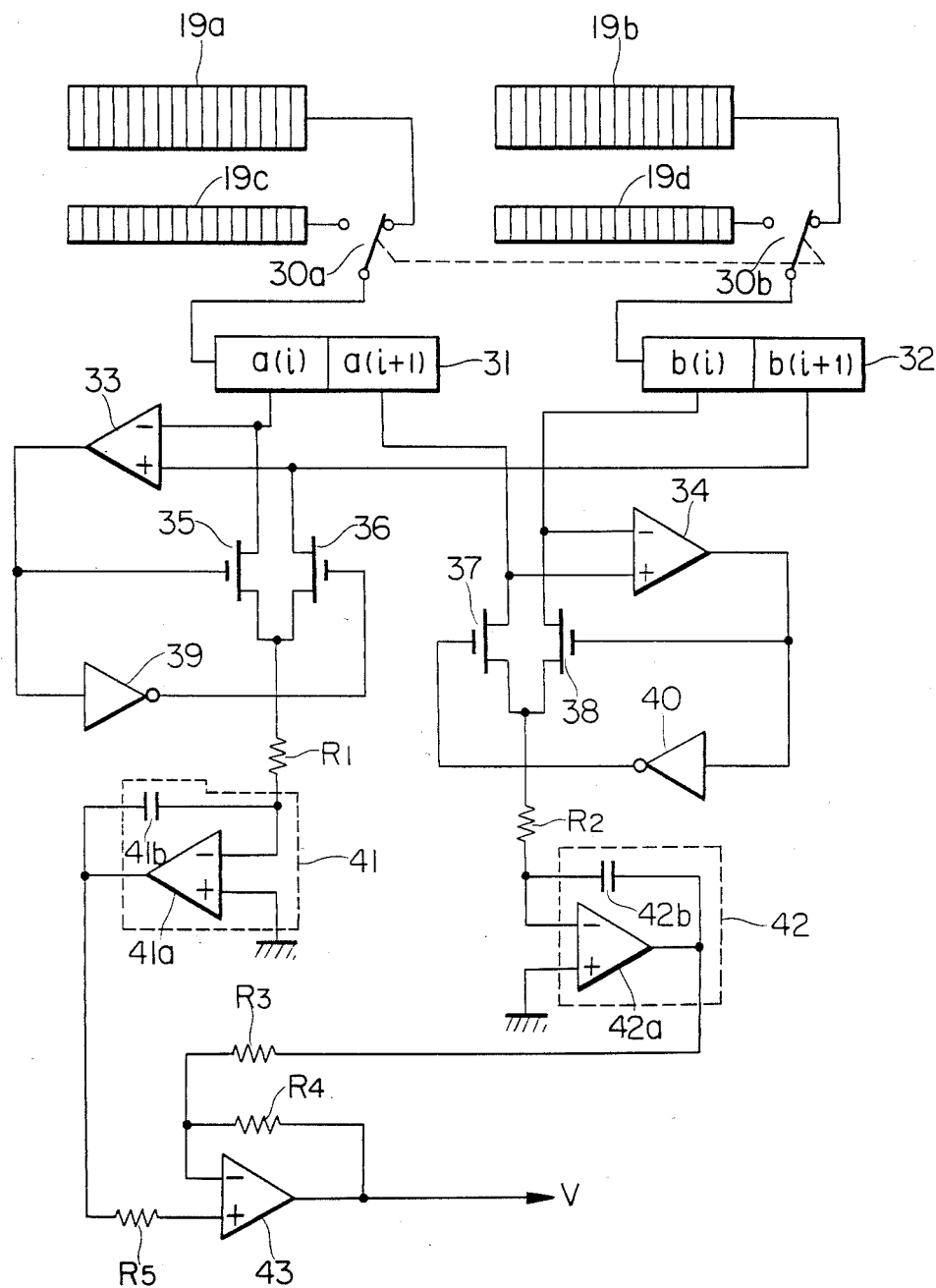
FIG. 5 is a circuit diagram of a signal processing circuit of the present invention.

FIG. 5 shows a circuit for carrying out the above processing by analog signals. Numerals 19a–19d denote the photo-sensing means, and numerals 30a and 30b denote the switches which are actuated by the pins (not shown) having lengths each representing the aperture F number of the object lens 10, when the object lens 10 is mounted on the camera body. When the light object lens 10 is mounted on the camera body, the switches 30a and 30b are switched to select the photo-sensing means 19a and 19b, respectively, and when the dark object lens 10 is mounted on the camera body, the switches 30a and 30b are switched to select the photo-sensing means 19c and 19d, respectively. The output signals a(i) and b(i) outputted from the photo-sensing means 19a and 19b or the photo-sensing means 19c and 19d through the switches 30a and 30b in the form of time sequential signal are supplied to two analog shift registers 31 and 32. The photo-sensing means 19a and 19b or 19c and 19d need not be physically isolated but they may share one line of photo-sensing means. The electronic circuits are synchronized by a clock generator, not shown. The shift registers 31 and 32 hold signals a(i) and a(i+1) and signals b(i) and b(i+1), respectively, and they are connected to a comparator 33 which determines min {a(i), b(i+1)} of the formula (1) and to a comparator 34 which determines min {a(i+1), b(i)}, respectively. The comparator 33 a NOT gate 39 which produces an inverted output alternatively control analog switches 35 and 36 so that a sample and hold circuit 41 comprising an operational amplifire 41a and a capacitor 41b produces the output min {a(i), b(i+1)}. Similarly, the comparator 34 and a NOT gate 40 which produces an inverted output alternatively control analog switches 37 and 38 so that a sample and hold circuit 42 comprising an operational amplifier 42a and a capacitor 42b produces the output min {a(i+1), b(i)}. The outputs of the sample and hold circuits 41 and 42 are supplied to a differential amplifier 43 which produces the in-focus discrimination signal V. $R_1-R_5$ denote resistors.

Figure 6:
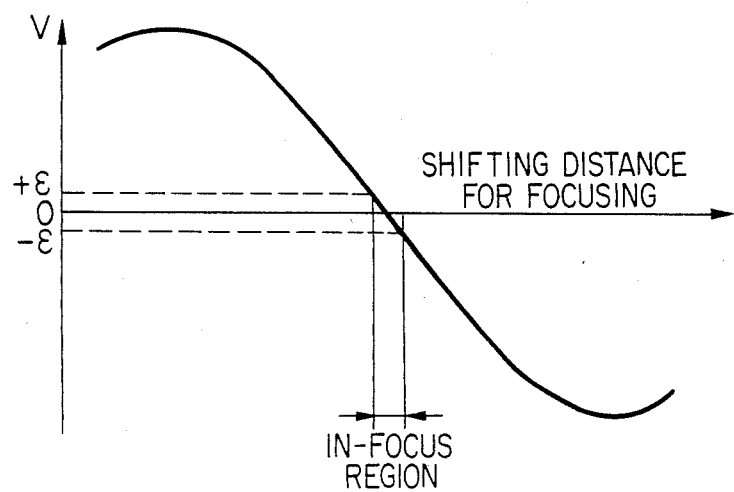
FIG. 6 is a diagram showing an output of the circuit of FIG. 5.

This circuit can indicate a direction of movement of the object lens 10 toward the in-focus state when the object lens 10 is out of focus. The positive and negative polarities of the signal V in the formula (1) correspond to a near-focus state and a far-focus state, respectively. When $|V| < \frac{1}{3}$ (where $\frac{1}{3}$ is a preset small constant), the in-focus state is discriminated. This is illustrated in FIG. 6, which shows a change of the value V as the object lens 10 is extended.

If the amount of defocus is quantatively determined, an in-focusing speed of a servo system of an automatic focusing device is increased. An absolute value of the indication of the direction shown in the formula (1) varies depending on a contrast of the object (although the polarity is not changed) and the in-focus range defined by $|V| < \frac{1}{3}$ is not constant. On the other hand, since the amount of defocus does not depend on the contrast of the object, it can be used as an in-focus discrimination reference if an allowable amount of defocus is property set.

Figure 7:
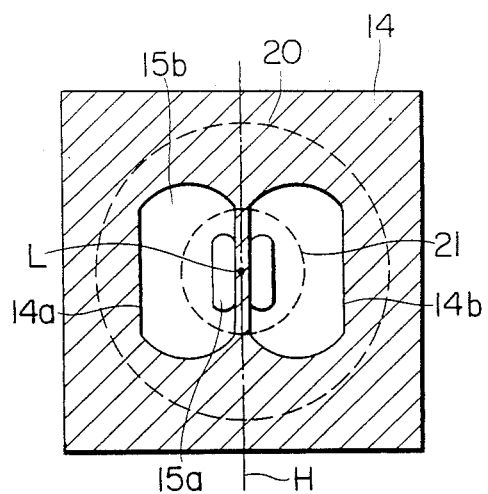
FIG. 7 is a plan view of another embodiment of the present invention.

The shape of the apertures 14a and 14b of the mask plate 14 and the shape of the light deflectors 15a and 15b of the light split means 15 in the present embodiment are not limited to the square shapes but they may be any shape so long as they have functions to deflect the light fluxes in accordance with the relation described above. For example, shapes as shown in FIG. 7 may be used in order to increase the amount of light directed from the exit pupil of the object lens 10 to the photo-sensing means 19a–19d. FIG. 7 shows a relation between the exit pupil 20 and 21 of the object lens 10 and the light dividing means 15. In the embodiment of FIG. 7, the apertures 14a and 14b of the mask plate 14 are arranged symmetrically around a line segment H which passes through the optical axis L and short side edges thereof are of arc shape. The light deflector 15a of the light split means 15, when it is divided by the line segment H, has its short side edges shaped arcuate.

By this arrangement, larger amount of light can be directed to the photo-sensing means than the embodiment of FIG. 4 does, and the light fluxes in the peripheral area of the object lens where an aberration of lens likely to occur is less used so that a focusing ability is improved.

In the present embodiment, the object image focused by the imaging lens 10 is split to four second object images per slit by the light split means. Alternatively, more than four second object images may be refocused, and more than two slits may be formed in the light shielding plate 12. When exchangeable lenses of different aperture F numbers are used, the photo-sensing means may be selected by an electric switch which is actuated by a signal from a full-open F number correction pin of the lens.

As described hereinabove, in accordance with the present invention, when the light object lens is used, the focusing state of the object lens is detected based on the plurality of object images formed by the light fluxes transmitted through the center area and the peripheral area of the object lens, and when the dark object lens is used, the focusing state of the object lens is detected based on the plurality of object images formed by the light fluxes transmitted through the center area of the object lens. Accordingly, the precision of detection of the focusing state is always high and the light fluxes transmitted through the object lens can be effectively utilized. As a result, the precision of detection of the focusing state when the field is dark is improved over that of the prior art detector.

What we claim is:

1. A focus detecting system comprising:
   (a) first optical means;
   (b) light shielding means having a plurality of apertures, said light shielding means being disposed near an imaging plane of said first optical means;
   (c) second optical means for forming a plurality of first object images based on light fluxes transmitted through a center area around an optical axis of said first optical means and forming a plurality of second object images based on light fluxes transmitted through a peripheral area of said first optical means, said second optical means being disposed behind the imaging plane of said first optical means;
   (d) first photo-sensing means arranged to receive both said first object images and said second object images formed through one of the apertures of said light shielding means;
   (e) second photo-sensing means arranged to receive only said first object images formed through another aperture of said light shielding means; and
   (f) discrimination means for discriminating a focusing state of said first optical means by a signal outputted from one of said first photo-sensing means and said second photo-sensing means.

2. A focus detecting system according to claim 1 wherein said light shielding means has at least two apertures arranged symmetrically about the optical axis of said first optical means.

3. A focus detecting system according to claim 1 wherein said second optical means includes light split means having a plurality of light deflectors, and image forming means.

4. A focus detecting system according to claim 2 wherein said light split means has two light deflectors having different deflection angles for the light fluxes.

* * * * *

UNITED STATES PATENT AND TRADEMARK OFFICE
CERTIFICATE OF CORRECTION

PATENT NO. : 4,563,576

DATED : January 7, 1986

INVENTOR(S) : Susumu Matsumura, et al.

It is certified that error appears in the above-identified patent and that said Letters Patent is hereby corrected as shown below:

In the Abstract, line 8, after "flux" insert -- from --.

Col. 1:  line 14, "A focusing" should be -- A focus --;
        line 14, "a focusing" should be -- the focusing --;
        lines 16-17, "formed based on light" should be -- formed on the basis of light --;
        line 25, "enhance a" should be -- enhance --;
        line 52, "positioned" should be -- positional --;
        line 59, "image" should be -- images --;
        line 63, "lens" should be -- lenses --;
        line 63, "a space is saved." should be -- space is saved --.

Col. 2:  line 18, "deflectros" should be -- deflectors --;
        line 19, "deflect" should be -- deflects --.
        line 23, "underword" should be -- downwardly --;
        line 32, "axis L. the" should be -- axis L. The --;
        line 61, "enables the discrimination" should be -- enable discrimination --.

Col. 3:  line 68, "out side" should be -- outside --.

Col. 4:  line 30, "outputs" should be -- output --.
        line 32, "to utilizes" should be -- to utilize --;
        line 66, "focused is" should be -- focused in --;
        line 65, "denotes" should be -- denote --;

UNITED STATES PATENT AND TRADEMARK OFFICE
CERTIFICATE OF CORRECTION

PATENT NO. : 4,563,576

DATED : January 7, 1986

INVENTOR(S) : Susumu Matsumura, et al.

It is certified that error appears in the above-identified patent and that said Letters Patent is hereby corrected as shown below:

Col. 5: line 3, "is light" should be -- is a light --;
line 7, "is dark" should be -- is a dark --;
lines 9-10, "is dark" should be -- is a dark --;
line 17, "of a difference" should be -- of difference --;
line 23, "also detect" should be -- also to detect --;
line 29, "a formula" should be -- a formula: --;
line 68, "33 a NOT" should be -- 33 and a NOT --.

Col. 6: line 3, "amplifire" should be -- amplifier --;
line 18, "When $|v| < \frac{1}{3}$ (where 1/3 is" should be -- When $|v| < \xi$ (where $\xi$ is --;
line 22, "quantatively" should be -- quantitatively --;
line 29, "by $|v| < \frac{1}{3}$ is" should be --by $|v| < \xi$ is --;
line 33, "property" should be --properly--;
line 52, "arrengement, larger" should be -- arrangement, a larger --;
line 60, "split to" should be -- split into --.

Signed and Sealed this

Twenty-eighth Day of October, 1986

[SEAL]

Attest:

DONALD J. QUIGG

Attesting Officer  Commissioner of Patents and Trademarks